United States Patent
Parker et al.

(10) Patent No.: US 7,539,705 B2
(45) Date of Patent: May 26, 2009

(54) SYSTEM AND METHOD FOR MANAGING PROFILES IN COMMUNICATIONS DEVICES BASED ON A COMPUTER APPLICATION ENVIRONMENT

(75) Inventors: Jason M. Parker, San Antonio, TX (US); Herman Rodriguez, Austin, TX (US); Candida Valois, Miami, FL (US)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 11/465,578

(22) Filed: Aug. 18, 2006

(65) Prior Publication Data

US 2008/0046465 A1 Feb. 21, 2008

(51) Int. Cl.
*G06F 12/00* (2006.01)
(52) U.S. Cl. .......................... 707/203; 707/100; 707/10
(58) Field of Classification Search ................. 707/104, 707/206, 203, 100, 10

See application file for complete search history.

(56) References Cited

U.S. PATENT DOCUMENTS

2007/0067373 A1* 3/2007 Higgins et al. .............. 707/206

OTHER PUBLICATIONS synonym.com defines "notify" as "inform".*

* cited by examiner

*Primary Examiner*—Mohammad Ali
*Assistant Examiner*—Donald Lawson
(74) *Attorney, Agent, or Firm*—Janis E. Clements

(57) ABSTRACT

A system and method for managing a device profile in a communications device based on a computer application environment wherein the device profile is indicative of a computer application environment. A computer software agent inspects application program attributes of at least one running application on the user's computer. The device profile is managed responsive to said inspection. A notification system notifies a party attempting to contact the user's communication device with an indication corresponding to termination of communication. The notification system informs the user regarding details of attempted communications occurring while the at least one application was running, such as time of communications, identity and communication information of communicators, whether disabled communicator left a message, and the like.

3 Claims, 5 Drawing Sheets dress # SYSTEM AND METHOD FOR MANAGING PROFILES IN COMMUNICATIONS DEVICES BASED ON A COMPUTER APPLICATION ENVIRONMENT

TECHNICAL FIELD

The present invention relates to the management of communications in a communications device. More particularly, the present invention relates to methods, apparatus, and products for managing profiles in communications devices based on the attributes of the computer programs running in a computer application environment.

BACKGROUND OF RELATED ART

The rapid growth of the telecommunications industry has been fueled by the ever increasing need for users to connect with other users, and for satisfying the need to connect and to stay connected using a plurality of devices. For instance, it is not uncommon for a user to be able to be reached at any time using a mobile phone, a pager, a connected personal digital assistant (PDA), or some other mobile device. It is also not uncommon for the same user to carry one or more of these devices at any one time.

As the need to stay connected has increased, a user can now be reached with one of those devices at virtually any place and time and for virtually any reason. For example, a user may be reached for a pre-arranged business call even while the user is on vacation at a remote location. In another example, a traveling salesman may be reached with updated inventory information using the salesman's mobile phone or pager, while the salesman is presenting a business proposal to a client.

While this ability for a user to stay connected and to be reached provides invaluable advantages in many situations, this same ability has created new problems for that user. One such problem is manifested when the user may be giving a sales presentation to a client (such as a PowerPoint™ presentation), only to be interrupted in the middle of his presentation by a family member who would like to inquire about plans for the weekend, or to be interrupted by an instant message from a co-worker with feedback about the client. While the family query may be legitimate and appropriate during a break in the presentation, it certainly would not be appropriate in the middle of the business presentation. In similar fashion, while the co-worker's instant message may be important in some other context, it certainly would not be appropriate within the context of the business presentation. However, if the user was not in the middle of the presentation, but instead was working on a draft of the proposal, then the interruption may be appropriate and may even be welcomed.

Furthermore, while the user is presenting the business proposal, it would be helpful for the family member attempting to reach that user about the weekend plans, if the family member was informed at a later time when the user becomes available to accept calls to discuss those plans, or if the co-worker attempting to instant message with the user was informed at a later time when the user becomes able to communicate.

In another instance, the user who is giving a similar business sales presentation may want to prevent interruptions from all other callers except those from the user's accounting department with new inventory or pricing information.

Current systems allow a user to forward incoming telephone calls to another number while the user is traveling. Other systems allow the user to manually select a telephone profile to inhibit or reduce interruptions. In the case where the user has selected a mobile telephone profile to silence the phone, any attempt to reach the user will go unanswered until the user inspects the phone log for missed calls or resets the profile. Similarly, when a caller, who may have an important message to deliver, attempts to reach a user who has silenced his phone, the caller after several attempts may simply give up attempting to reach the user as his calls go unanswered.

What is needed, therefore, is a method and system for managing communication based on the user's current activities. Furthermore, there is a need for callers and other parties who have attempted to contact the user, to be informed about when it is appropriate to retry the attempt to connect with the user.

SUMMARY OF THE PRESENT INVENTION

The present invention provides a computer implemented method for managing a device profile in a communications device wherein the device profile is indicative of a computer application environment. An inspection of the application program attributes is made of at least one currently running application in the computer application environment, and the device profile is managed in said communications device, i.e. telephone, pager, PDA, laptop computer, or the like, responsive to said inspection. The present invention can include a feature of notifying a party attempting to contact the user's communications device with a message that corresponds to the at least one currently running application program in the computer application environment. The party attempting to contact the user's communication device can be notified with an indication that corresponds to the termination of the at least one currently running program. Further, a log of attempts to contact the user's communication device can be maintained, wherein derails regarding notified parties are stored. Said log can be presented to the user when the at least one currently running application terminates. Communications with the can be via telephone network connection, inter-program communications, or the like.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
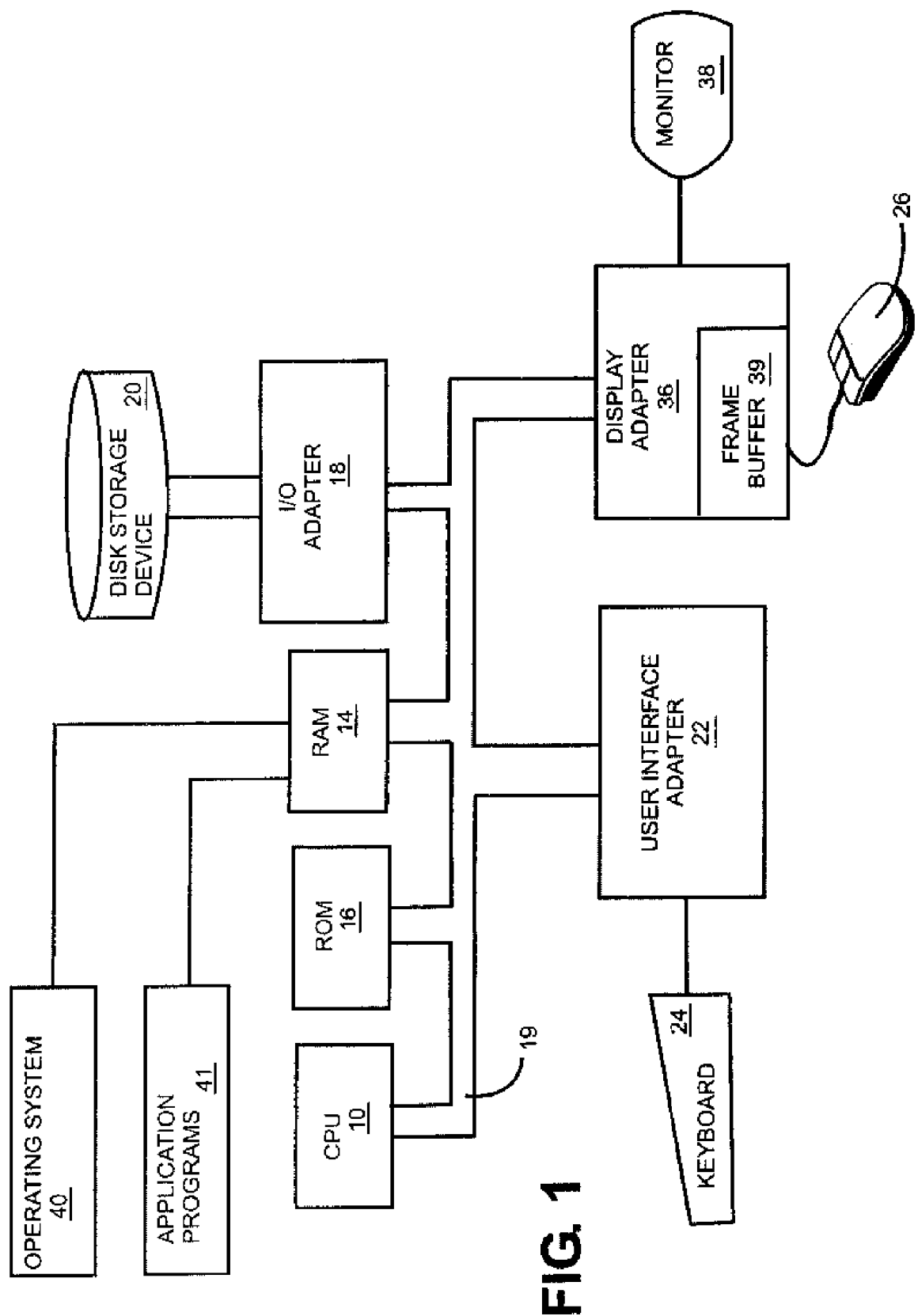
FIG. 1 is a block diagram of a generalized data processor controlled system on which the present invention for managing profiles in communications devices based on a computer application environment may be practiced.

Referring to FIG. 1, a generalized system is shown which may function as a basic data processing system on which the present invention may be implemented. A CPU 10 is provided and interconnected to various other components by system bus 19. An operating system 40 runs on a CPU 10, provides control and is used to coordinate the functions of the various components of FIG. 1. Operating system 40 may be one of the commercially available operating systems which is capable of handling single or multiprocessing, such as IBM's AIX™ operating system, Microsoft's Windows XP™ and UNIX™ operating systems. The operating system may be in random access memory (RAM) 14 during the system operation. Application programs 41 controlled by the system can be moved into and out of the main memory, RAM 14. These application programs may include the programs for carrying out the present invention which will hereinafter be described in greater detail. It should be noted that the program logic and methods of the present invention may be implemented as software, firmware, hardware, or a combination thereof.

The system shown in FIG. 1 also includes the following conventional elements. A read only memory (ROM) 16 is connected to CPU 10 via system bus 19. RAM 14 and I/O adapter 18 are also interconnected to system bus 19. I/O adapter 18 may be a small computer system interface (SCSI) adapter that communicates with the disk storage device 20. I/O devices are also connected to system bus 19 via user interface adapter 22 and display adapter 36. Keyboard 24 and mouse 26 are all interconnected to bus 19 through user interface adapter 22. It is through such input devices that the user may interact with a browser and the related programs according to the present invention. Display adapter 36 includes a frame buffer 39, which is a storage device that holds a representation of each pixel on the display screen of the monitor 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Figure 2:
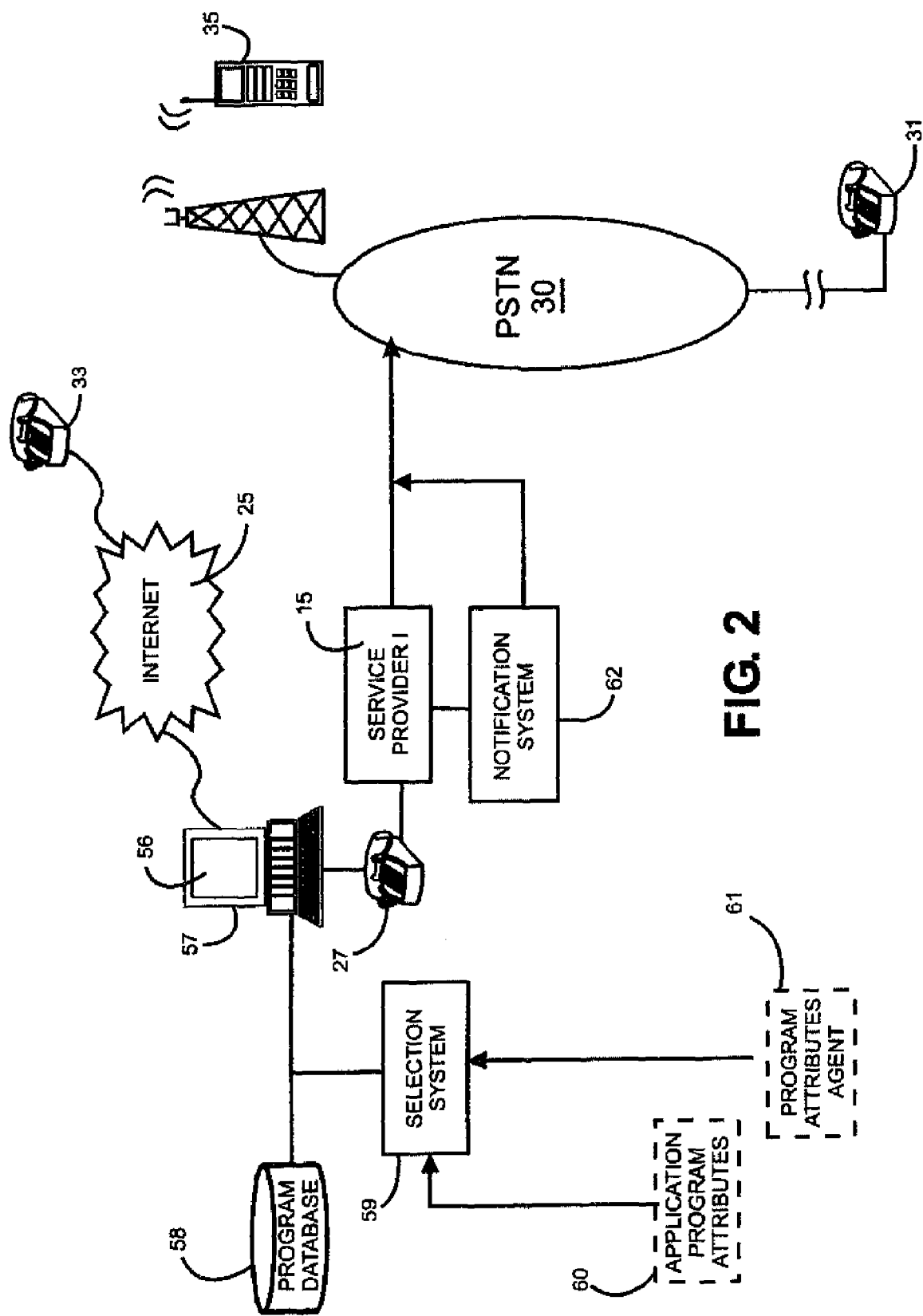
FIG. 2 is a block diagram of a control panel display of the present invention.

In FIG. 2 there is illustrated a communications network in which the present invention may be practiced, showing telephones 31, 33, 35 used by communicators to originate communications to a user's telephone 27. Anyone skilled in the art will appreciate that telephones 31, 33, 35, and 27 can include communications devices such as two way pagers, PDAs, laptop computers, and the like. The telephones 31, 33, 35, 27 of the present invention can include landline devices, wireless devices, VOIP Phones, and the like.

FIG. 2 shows an embodiment of a generalized diagrammatic view of a portion of a Public Switched Transmission Network (PSTN) 30 showing channel paths to and from both conventional wired and mobile wireless channels and devices. To illustrate the calling station, four telephones are shown: caller's telephones 31, 33, 35, and receiver's (user's) telephone 27. The user's telephone 27 is connected to the PSTN 30 via a service provider 15. Alternatively, user telephone 27 may be connected to voice over IP (VOIP) software used to place telephone calls using the Internet 25. The preferred embodiment of the present invention configures the user's telephone 27 to manage incoming communications based on the application environment of a user computer 57. The method of the present invention manages a device profile in a user communications device preferably using a computer 57 having a user interactive display 56 using settings entered by a user and stored in a database 58. A program attributes agent 61 for monitoring application program attributes 60 in a selection system 59 detects a running application on the user's computer 57, and inspects the application program attributes 60 of said application. Application program attributes 60 of the at least one currently running application on a user's computer 57 are inspected. A determination regarding whether said application can be interrupted by an incoming call is responsive to the inspection of the application program attributes 60. If the application can be interrupted by the communication, the communications device and settings enable the incoming communication.

The inspecting of application program attributes 60 comprises installing a plurality of application program attributes 60 that corresponds to a plurality of communications device profiles of at least one communications device. The inspection also comprises selecting at least one application program attribute from the plurality of application program attributes 60, wherein each program attribute is associated with a profile in the at least one communication device, and associating the selected at least one application program attribute with the at least one communications device. The installing of the application attributes further comprises at least one of installing application attributes when an application program includes application program attributes 60 for managing a profile of a communications device, and installing application attributes of a wrapper application associated with an application program that does not include attributes for managing a profile of a communications device. The inspecting of application program attributes 60 stores an indicator indicating at least one of the following: (i) the application program is loaded for execution; (ii) there is a change in the z-order of the display window of the at least one currently running application program; (iii) there is a change in geometry of any window in the at least one currently running program; and (iv) the application program terminates; and using said indicator when managing at least one device profile. The managing of said device profile in said communications device further comprises determining whether said inspection of application program attributes indicates managing a device profile, responsive to said determining, notifying the communications device with an indication for managing the indicated device profile, and managing the device profile with said indication.

Incoming calls are enabled and ring through when the inspection of the application environment through various program properties settings determines that a call should ring through. The invention can include a notification system 62 for sending a message to a disabled caller regarding the disabled call. In one embodiment, a party attempting to contact the user's communications device is notified with a message that corresponds to the at least one currently running application program in the computer application environment. The party attempting to contact the user's communication device can be notified with an indication that corresponds to the termination of the at least one currently running program. A user can return caller's call at the user's discretion and convenience. Communications to the caller can be via telephone network connection, inter-program communications, or the like. A log of attempts to contact the user's communications device can be maintained with information regarding notified parties stored therein, and presented to the user when the at least one currently running application terminates.

For example, when there is a program application like PowerPoint™ being carried out on the computer display, e.g. "PowerPoint™" presentation, IP telephone user can customize the attributes of the telephone to disable incoming calls when the PowerPoint™ presentation is in "Slide Show" mode. However, if PowerPoint™ is in edit mode, the call may be allowed. In one embodiment, one application attribute that can be considered is if the application is using "full screen". This application program attribute 60 can be used to determine whether calls should be forwarded to voicemail, for example, instead of being directed to the user's telephone 27. In one embodiment, with broadband cable wherein a user is using IP-TV, a determining factor by the system of the present invention may be the user's current television selection. For example, if the user is watching a live pay-per-view show, the user's telephone may be configured to enable only emergency calls, or calls from select trusted parties. When the user switches the television to another channel, telephone calls may be enabled.

Figure 3A:
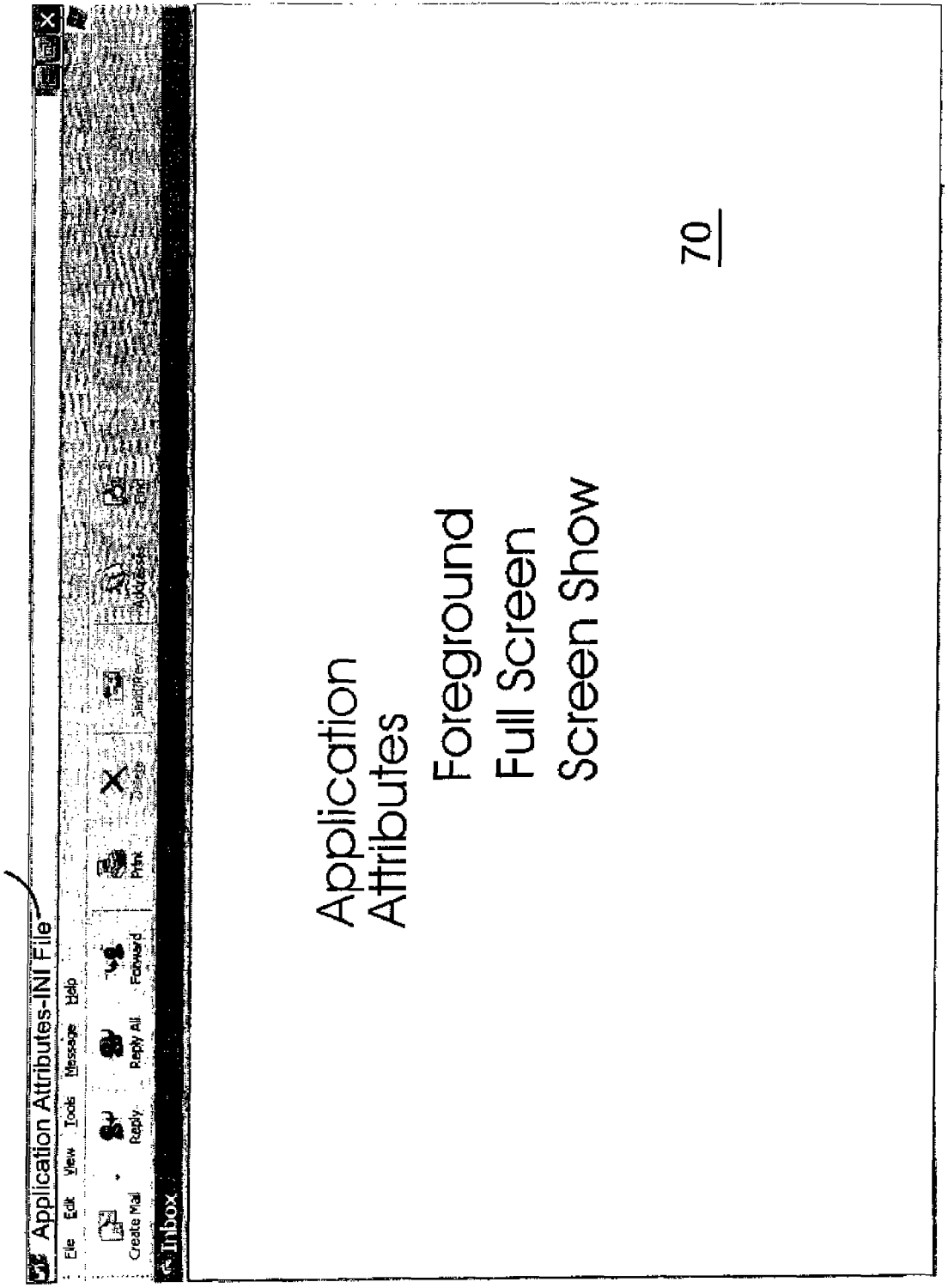
FIG. 3a is a diagrammatic illustration of application program attributes settings of the present invention.

FIG. 3a is an embodiment of the present invention showing a diagrammatic illustration of program attributes settings. In FIG. 3a, a user's application program attributes shown on a user's display screen 71 and are stored in an INI File 71. One example of system settings which could be used to disable communications by the user is an application in foreground, full screen mode, such as with a presentation slide show, or the showing of a full screen video stream. While the invention is applicable to landline phones, wireless, IP Phone telephony, and the like, it also applies to such communications coming from laptop computers, pager, PDAs, or the like, resulting in printed messages, such as E-mail. The present invention prevents a user from receiving such printed messages while the user is giving a presentation. Not only are the timing of such communications annoying, they can also result in embarrassment to the user should the messages be displayed to attendees during a presentation. With respect to IP Phone telephony, this invention is particularly useful in customizing audio capabilities of the user's telephone in addition to customizing the manner in which the telephone reacts to an incoming call.

Figure 3B:
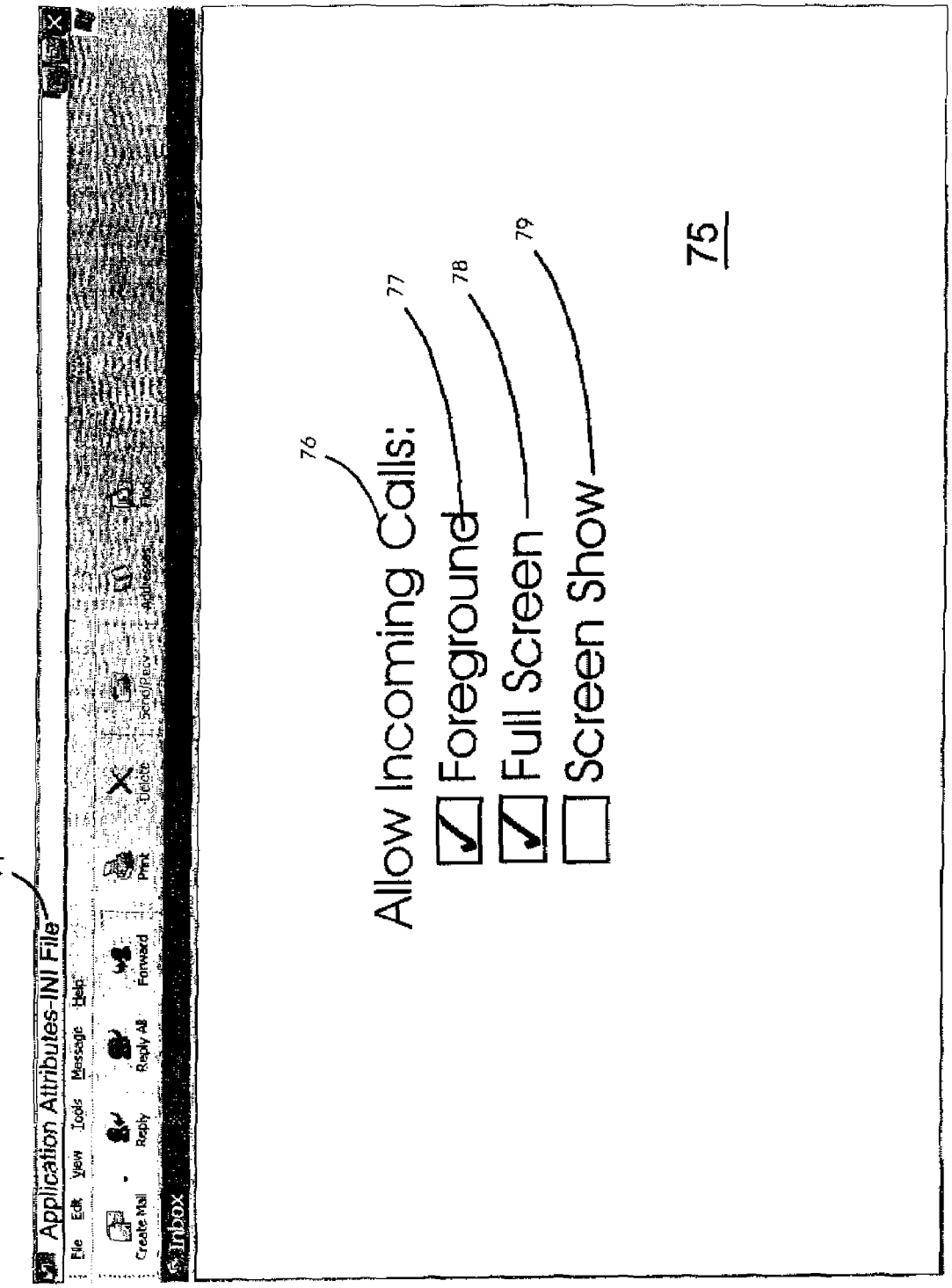
FIG. 3b is a diagrammatic illustration of a computer screen showing the program installation of the present invention.

FIG. 3b is an embodiment of the present invention showing a diagrammatic illustration of a computer screen showing the program installation of the present invention. In FIG. 3b, as shown on the user's computer display screen 75, incoming communications are enabled or allowed 76 when a user's application is in "Foreground" mode 77 and in "Full Screen" mode 78, but not when the user's application is in "Screen Show" mode 79. When a communication is disabled due to the user's application activity, one embodiment of the present invention may include a notification system that submits a message informing the disabled communicator that the user is engaged in a particular task that prevents answering the communications device. The present invention may also include an automatic notification system whereby the disabled communicator is notified when the user disengages from the activity that caused the incoming call to be disabled, i.e., if the user were giving a presentation in "Screen Show" mode 79 and the user completed the presentation and closed the "Screen Show" mode 79. Said notification message could instruct the communicator to retry the communication. Alternatively, the user may initiate the communication. Said communication to the communicator can be by network connection, or in the case of IP telephone where the telephone application is running of the same computing device, means can be inter-program-communications.

In one embodiment of the present invention, the software agent communicates with the communications device, or the telephone service provider, to enable and disable notifications. The communications device can be a wireless cellular phone, an IP phone, an analog phone, or the like. In one embodiment, SMS messaging can communicate with the service provider. In another embodiment using IP telephony, communication with the service provider is via sockets. When an analog phone is used by the communicator, communication with the service provider is through touch tones. With a PBX, communication is made with the PBX controller using PBX control messages.

With the present invention, as set forth above, a telephone user can customize the application program attributes of the telephone to disable incoming calls when a PowerPoint™ presentation is in "Slide Show" mode. However, if PowerPoint™ is in edit mode, the call may be allowed. In another embodiment, one application program attribute that can be used is if the application is using "full screen" and this attribute is used to determine whether calls should be forwarded to voicemail, for example, instead of being accepted by the user. With IP telephony over broadband cable, this invention may further provide status to the telephone system of the present invention based on a current television selection. For example, if the user is watching a live pay-per-view show, the user's telephone may be configured to accept only emergency calls, or calls from select trusted parties. When the user switches the television to another channel, telephone calls may be allowed.

Figure 4:
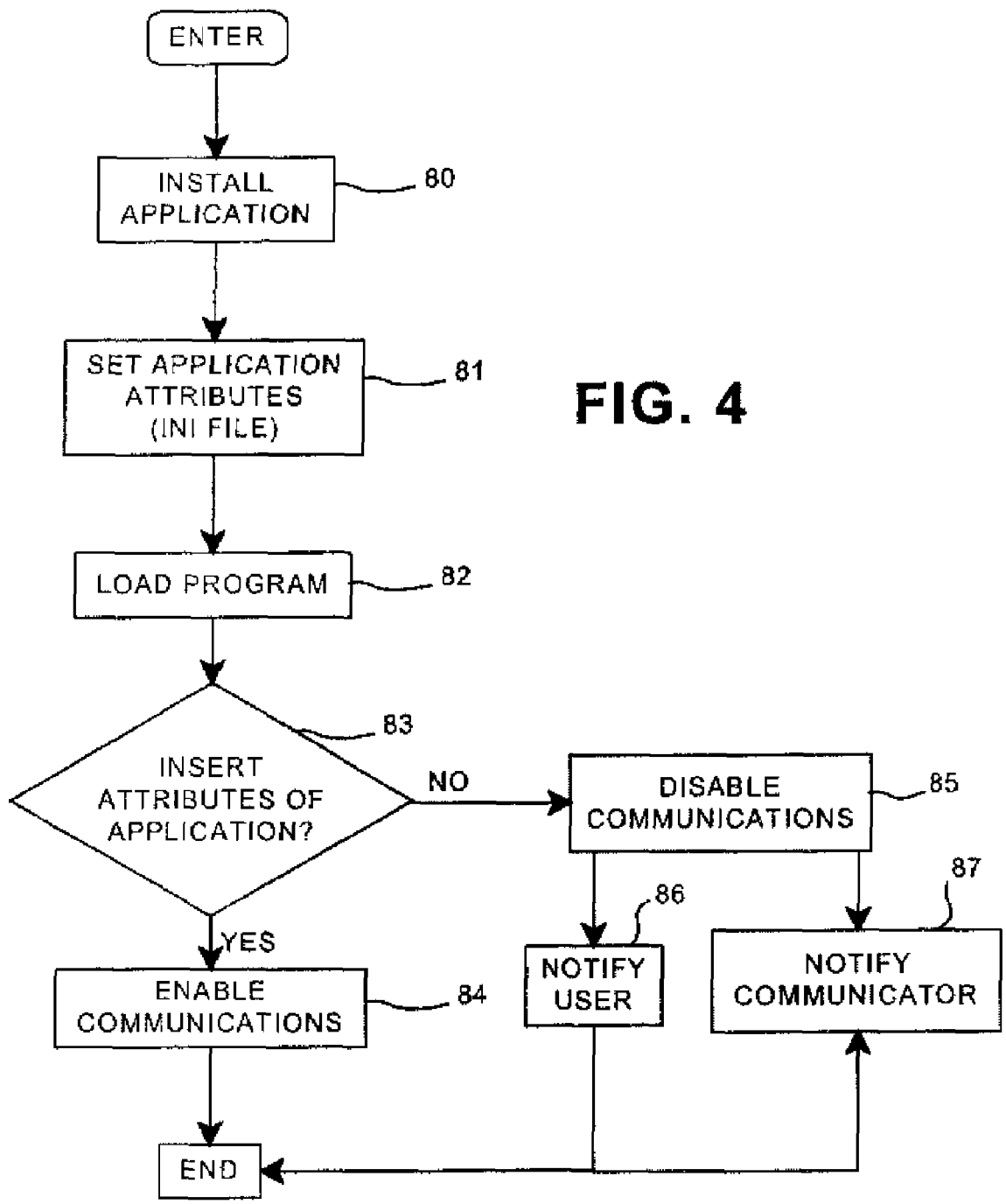
FIG. 4 is a flowchart of an illustrative run of the program set up according to FIGS. 3a and 3b.

A simplified run of an embodiment of the process of the present invention set up in FIGS. 3a and 3b will now be described with respect to the flowchart of FIG. 4. First, the user installs the program or profile, step 80, and sets the application program attributes, step 81. The application program attributes can be stored in an INI File. Then the program is loaded, step 82. A determination is made during the inspection of application program attributes, step 83, regarding whether incoming communications are enabled or disabled. If Yes, communications are enabled, step 84, and the process ends. If No, communications are disabled, step 85. When incoming communications are disabled, in one embodiment of the present invention, a notification system notifies a user regarding details of the disabled communications, step 86, such as time of communications, identity and communication information of communicators, whether disabled communicator left a message, and the like. The notification system may also be set to notify communicators regarding details of disabled communications, step 87, such as the reason for the disabled communication, a time for the communicator to retry the communication, and an option to leave a message for the user. The communications agent of the present invention could inform the communicator upon termination of the event that caused the disabling of the communication so the communicator could retry the call. Once notifications are sent to a user, step 86, and a communicator, step 87, the process ends.

Notifications to the user and communicators could be via presentation of a menu or pop-up on the user's and communicator's computer monitor regarding disabled communications occurring while the user was otherwise engaged. The present invention includes not only disabling communications, but other interruptions originating from a call, such as voicemail notifications that may also get blocked, or other such interruptions to a computer user. Alternatively, the telephone agent may use a caller-ID record to initiate an instant message to the communicator regarding the availability of the user. If the user's communications device is a wi-fi enabled telephone, or the like, communication of status and events to the communicator is accomplished between the telephone agent running on the user's computer and the telephone unit using wireless messaging. If the user's telephone is a landline telephone, the user's computer may communicate with the telephone system operator using network program to program communications. In this case, the user's telephone is indirectly configured, and status may be maintained either by the telephone system operator or by the telephone unit itself.

In one embodiment, status of a disabled communication is transmitted to a service provider for said user, and said message to a disabled communicator is transmitted by said telephone service provider. Said status includes the user's ability to disable and enable communications.

One of the preferred implementations of the present invention is an application program 41 made up of programming steps or instructions resident in RAM 14, FIG. 1, during computer operations. Until required by the computer system, the program instructions may be stored in another readable medium, e.g. disk drive 20, or in a removable memory such as an optical disk for use in a CD ROM computer drive or in a floppy disk for use in a floppy disk drive computer input. One skilled in the art would appreciate that the processes controlling the present invention are capable of being distributed in the form of computer readable media of a variety of forms. The invention may be enabled also in firmware, hardware, or a combination of hardware and software. When the implementation of this invention involves a network, such as the Internet, the applications involved in this invention may be transmitted through the Internet via wired or appropriate wireless transmissions so that they may be downloaded at the computer controlled device using the applications.

Although certain preferred embodiments have been shown and described, it will be understood that many changes and modifications may be made therein without departing from the scope and intent of the appended claims.

The invention claimed is:

1. A computer implemented method for managing a device profile in a communications device, a processor and memory, wherein the device profile is indicative of a computer application environment, said method comprising:
   inspecting application program attributes of at least one currently running application in the computer application environment;
   wherein the inspecting of said application program attributes comprises:
      installing a plurality of application program attributes that corresponds to a plurality of communications device profiles of at least one communications device;
      selecting at least one application program attribute from the plurality of application program attributes, wherein each program attribute is associated with a profile in the at least one communication device;
      associating the selected at least one application program attribute with the at least one communication device;
   managing said device profile in said communications device responsive to said inspection;
   wherein said managing said device profile comprises:
      determining whether said inspection of application program attributes indicates managing a device profile;
      responsive to said determining, notifying the communications device with an indication form managing the indicated device profile; and
      managing the device profile with said indication;
   wherein installing application attributes comprises at least one of: (i) installing application attributes when an application program includes application program attributes for managing a profile of a communications device, and (ii) installing application attributes of a wrapper application associated with an application program that does not include attributes for managing a profile of a communication device;
   wherein the inspecting of application program attributes stores an indicator indicating at least one of: (i) the application programs is loaded for execution; (ii) there is a change in a z-order of the at least one currently running application program; (iii) there is a change in geometry of any window in the at least one currently running program; and (iv) the application program terminates; and using said indicator when managing at least one device profile;
   notifying a party attempting to contact the user's communications device with a message that corresponds to the at least one currently running application program in the computer application environment;
   notifying a party attempting to contact the user's communications device with an indication that corresponds to the termination of the at least one currently running program;
   maintaining a log of attempts to contact the communications device;
   storing in said log said notified parties; and
   presenting said log when the at least one currently running application terminates.

2. A computer controlled system for managing a device profile in a communications device, wherein the device profile is indicative of a computer application environment, said system comprising:
   a processor;
   a storage facility that stores the device profile;
   a memory having stored thereon a utility which executes on the processor to provide the functions of:
      inspecting application program attributes of at least one currently running application in the computer application environment;
      wherein the inspecting of said application program attributes comprises:
         installing a plurality of application program attributes that corresponds to a plurality of communications device profiles of at least one communications device;
         selecting at least one application program attribute from the plurality of application program attributes, wherein each program attribute is associated with a profile in the at least one communication device;
         associating the selected at least one application program attribute with the at least one communication device;
      managing said device profile in said communications device responsive to said inspection;
      wherein said managing said device profile comprises:
         determining whether said inspection of application program attributes indicates managing a device profile;
         responsive to said determining, notifying the communications device with an indication form managing the indicated device profile; and
         managing the device profile with said indication;
      wherein installing application attributes comprises at least one of: (i) installing application attributes when an application program includes application program attributes for managing a profile of a communications device, and (ii) installing application attributes of a wrapper application associated with an application program that does not include attributes for managing a profile of a communication device;
      wherein the inspecting of application program attributes stores an indicator indicating at least one of: (i) the application programs is loaded for execution; (ii) there is a change in a z-order of the at least one currently running application program; (iii) there is a change in geometry of any window in the at least one currently running program; and (iv) the application program terminates; and using said indicator when managing at least one device profile;
      notifying a party attempting to contact the user's communications device with a message that corresponds to the at least one currently running application program in the computer application environment;

notifying a party attempting to contact the user's communications device with an indication that corresponds to the termination of the at least one currently running program;

maintaining a log of attempts to contact the communications device;

storing in said log said notified parties; and presenting said log when the at least one currently running application terminates.

3. A computer program product having code recorded on a computer readable memory medium, which when executed by a processor will perform the method steps for managing a device profile in a communications device, wherein the device profile is indicative of a computer application environment, said program product comprising code for:

inspecting application program attributes of at least one currently running application in the computer application environment;

wherein the inspecting of said application program attributes comprises:

installing a plurality of application program attributes that corresponds to a plurality of communications device profiles of at least one communications device;

selecting at least one application program attribute from the plurality of application program attributes, wherein each program attribute is associated with a profile in the at least one communication device;

associating the selected at least one application program attribute with the at least one communication device;

managing said device profile in said communications device responsive to said inspection;

wherein said managing said device profile comprises:

determining whether said inspection of application program attributes indicates managing a device profile;

responsive to said determining, notifying the communications device with an indication form managing the indicated device profile; and managing the device profile with said indication;

wherein installing application attributes comprises at least one of: (i) installing application attributes when an application program includes application program attributes for managing a profile of a communications device, and (ii) installing application attributes of a wrapper application associated with an application program that does not include attributes for managing a profile of a communication device;

wherein the inspecting of application program attributes stores an indicator indicating at least one of: (i) the application programs is loaded for execution; (ii) there is a change in a z-order of the at least one currently running application program; (iii) there is a change in geometry of any window in the at least one currently running program; and (iv) the application program terminates: and using said indicator when managing at least one device profile;

notifying a party attempting to contact the user's communications device with a message that corresponds to the at least one currently running application program in the computer application environment;

notifying a party attempting to contact the user's communications device with an indication that corresponds to the termination of the at least one currently running program;

maintaining a log of attempts to contact the communications device;

storing in said log said notified parties; and presenting said log when the at least one currently running application terminates.

* * * * *